Aug. 1, 1961 P. T. BRANTINGHAM 2,994,419
CLUTCH MEMBER
Original Filed Oct. 5, 1953
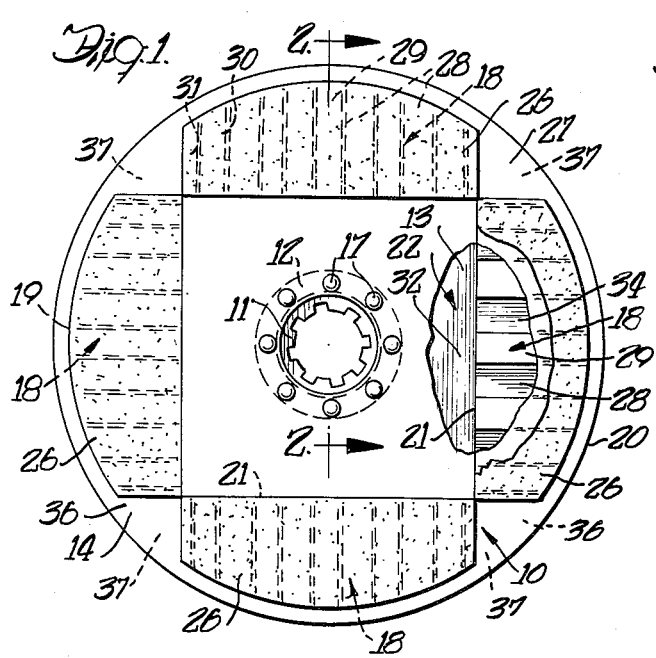
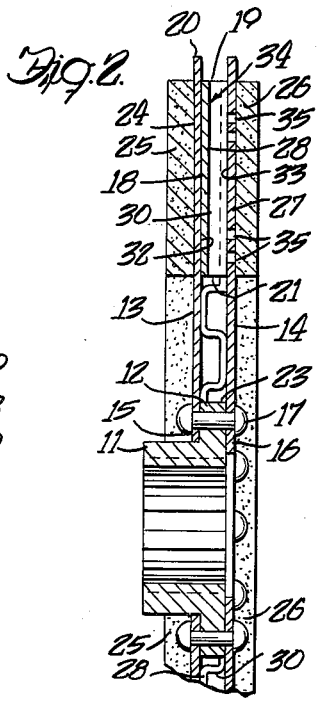
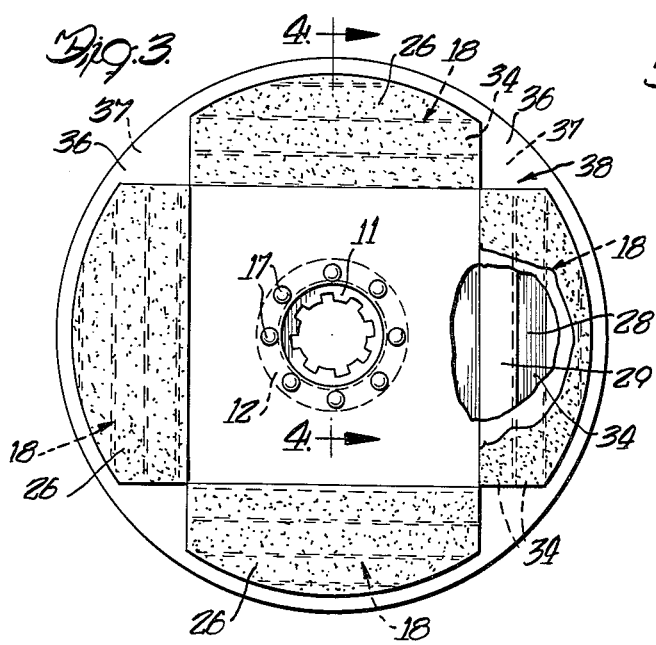
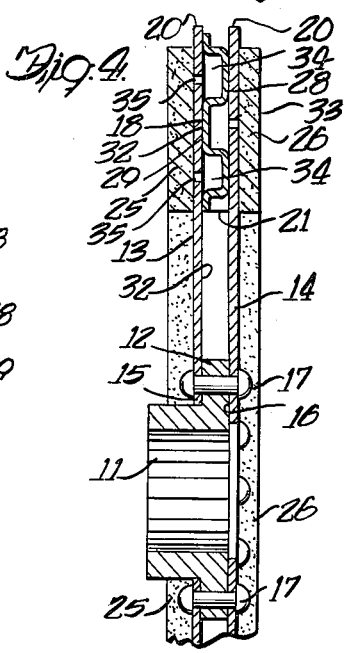
INVENTOR
PAUL TALBOTT BRANTINGHAM
ATTORNEY

United States Patent Office 2,994,419
Patented Aug. 1, 1961

2,994,419
CLUTCH MEMBER
Paul Talbott Brantingham, Glenn Ellyn, Ill., assignor to International Harvester Company, a corporation of New Jersey
Original application Oct. 5, 1953, Ser. No. 384,135. Divided and this application Oct. 7, 1957, Ser. No. 688,612
7 Claims. (Cl. 192—107)

This invention relates to clutch mechanisms, and more particularly to the construction of air-cooled clutch members. The present application is a division of applicant's application Serial No. 384,135, filed October 5, 1953, now abandoned, for "Clutch Members," and assigned to the assignee of the present application.

The present invention is primarily concerned with an improved construction for those members of a clutch mechanism of the type employed in power transmission systems wherein two or more relatively rotatable clutch members having facings or surfaces of friction material are periodically moved axially with respect to each other to bring mating friction facings into engagement under pressure and thus cause the clutch members to rotate in unison to effect completion of the power transmission train. During the engaging operation a considerable amount of heat is generated by virtue of the frictional losses occasioned when the mating surfaces are brought into contact with each other. The heat thus generated has an adverse effect on the facing material and other components of the clutch members and tends to shorten the effective operational life of the clutch mechanism. This is especially true in power transmission systems where the clutch mechanism must be repeatedly engaged and disengaged such as in automotive vehicle transmission systems. It is, therefore, an important object of the present invention to mitigate the deleterious effect of the generated heat by providing a friction clutch member construction in which is embodied efficient means for dissipating the heat continually.

Another object is the provision of a friction clutch member including a pair of spaced plates, each of which has a plurality of circumferentially spaced segments of friction material secured to the outer surface thereof, whereby air is permitted to flow between the plates adjacent the segments to cool the clutch member and to expose a predetermined area of the pressure plate and flywheel contact surfaces to the cooling effect of air circulation.

Still another object is the provision of a clutch member having novelly disposed and formed passages and passageways provided therein and means for circulating air through the passages and passageways while the clutch member is rotating whereby the air will continually cool the clutch member.

The foregoing and other important objects and desirable features inherent in and encompassed by the invention, together with many of the purposes and uses thereof, will become readily apparent from a reading of the ensuing description in conjunction with the annexed drawings in which:

FIGURE 1 is a view of a clutch member constructed in accordance with the invention;
FIGURE 2 is a sectional view taken substantially along line 2—2 of FIGURE 1;
FIGURE 3 is a view similar to FIGURE 1 but showing an alternative form of spacing means; and
FIGURE 4 is a sectional view taken substantially along line 4—4 of FIGURE 3.

Referring to the drawings in detail, wherein like reference characters represent like elements throughout the various views, a rotatable clutch member 10 is shown which includes a spline hub 11 adaptably secured to a shaft (not shown) of a power transmission system for rotation therewith. As shown in FIGURE 2, the hub 11 is provided with a radially projecting flange 12. A pair of axially spaced, ring-like plates 13, 14 have their inner peripheral edge portions 15, 16, respectively, abutting respective oppositely facing surfaces of the flange 12 and are rigidly secured to the hub 11 by means of a plurality of circumferentially spaced rivets 17 which extend through the peripheral edge portions 15 and the flange 12. Disposed between and secured to the plates 13, 14 by welding or other suitable means are spaced elements 18, and for the purpose of the invention four circumferentially spaced spacing elements 18 are shown. Each of the spacing elements 18 has its outermost edge 19 disposed adjacent the outer peripheral edges 20 of the plates 13, 14 and is curved to conform to the circle defined by the peripheral edges 20. The innermost edges 21 of the spacing elements 18 are radially spaced from the rotational axis of the clutch member 10 and lie along the central portions of cords of the circle defined by the peripheral edges 20 of the plates 13, 14. From the foregoing it will be appreciated that the spacing elements 18, flange 12 and rivets 17 are the sole means for rigidly interconnecting the ring-like plates 13 and 14 and maintaining the plates axially fixed with respect to each other. It will also be appreciated that the outer side and innermost limits of a compartment, designated generally by numeral 22, are defined respectively by the innermost edges 21 of the spacing elements 18, portions of the plates 13, 14, and the peripheral edge 23 of the flange 12.

Secured to the outwardly facing surface 24 of the plate 13, by any suitable means, are four segments 25 made of conventional friction clutch lining material. Each segment 25 is disposed in axial alignment with a respective spacing element 18 and a segment 26 similarly secured to the outwardly facing surface 27 of the plate 14. In operation, the friction facings of a pair of pressure plates (not shown) disposed on each side of the clutch member 10 are moved axially and forced into frictional engagement with the segments 25, 26 in order to engage the clutch mechanism. The spacing elements 18 not only serve as separators for maintaining the plates 13, 14 axially spaced with respect to each other, but also stiffen and rigidify the same. The plates 13, 14 also serve as means for permitting cooling air to flow between the segments 25, 26 as will be pointed out hereinafter.

The spacing elements 18 shown in FIGURES 1 and 2 are each of a one-piece construction and are formed with a plurality of oppositely projecting channel portions 28, 29. The webs 30, 31, respectively of the channel portions 28, 29 abut and are rigidly secured respectively to the inwardly facing surfaces 32, 33 of the plates 13 and 14. It will be appreciated that a plurality of passages 34 are thus provided which establish communication between the interior of the compartment 22 and the atmosphere surrounding the clutch member 10 which have their longitudinal axes lying along chords of a circle defined by the peripheral edges 20 of the plates 13 and 14 and each passage 34 has an end thereof opening into the compartment 22 to permit air to circulate between the plates to cool them as well as the segments 25, 26 which they carry. A series of apertures 35, formed in the plates 13, 14, facilitate the conduction of heat from the segments 25, 26 to the passages 34. By making the two friction engaging surfaces of the clutch member 10 in segment form rather than a continuous, single piece as in conventional constructions, air can flow into space 36 between the adjacent ends of the segments and the space 37 between the adjacent ends of the spacing elements 18 as the clutch member 10 is rotated to carry away the heat generated during the clutch engaging operation. By exposing a portion of the pressure plate surfaces an increase in the rate of heat dissipation is encouraged.

The clutch member 38 shown in FIGURE 3 is constructed in substantially the same manner as the clutch member 10 with the exception of the disposition of the channel portions 28, 29 of the spacing elements 18 and the passages 34. The passages 34 formed by this construction have their longitudinal axes lying along chords of the circle defined by the peripheral edges 20 of the plates 13, 14 also. However, each of the passages 34 has its ends opening into the spaces 37 provided between the adjacent ends of the adjacent spacing elements 18 whereby cooling air can freely circulate between the plates 13, 14 and the segments 25, 26 to carry away the heat generated during the clutch engaging operation. It will be appreciated that in both embodiments of the invention by segmenting and circumferentially spacing the spacing elements 18 and by further segmenting the friction facing material 25, 26 and mounting the same in axial alignment with the spacing elements 18, cooling air can freely circulate between the plates 13, 14 and at the circumferential ends of the spacing elements 18 and the segments 25, 26 to carry away the heat generated during the clutch engaging operation.

The embodiments of the invention chosen for the purpose of illustration and description herein are those preferred for achieving the objects of the invention and for developing the utility thereof in the most desirable manner, due regard being had to existing factors of economy, simplicity of design and construction, and the improvements sought to be effected. It will be appreciated, therefore, that the particular structural and functional aspects emphasized herein are not intended to exclude but rather to suggest such other modifications and adaptations of the invention as fall within the spirit and scope of the invention as defined in the appended claims.

What is claimed is:

1. A clutch member comprising a pair of axially spaced plates; a plurality of circumferentially spaced, rigid spacing means interposed between and rigidly interconnecting said plates, said spacing means extending inwardly from substantially the peripheral edges of said plates and the inner edges thereof being radially spaced from the rotational axis of the clutch member and being adapted to maintain one of said plates in a fixed, axially spaced relationship with respect to the other of said plates, at least a portion of each circumferential edge of each spacing means being circumferentially spaced from at least a portion of the adjacent circumferential edge of an adjacent spacing means, each of said spacing means being disposed along a portion of a respective chord of a circle defined by the peripheral edges of said plates, each of said spacing means having a plurality of parallel passages extending therethrough for the circulation of air, the longitudinal axis of each passage lying along a respective chord of a circle defining the peripheral edges of said plates; and a plurality of pairs of friction segments, the segments of each pair being secured to the outer face portions of said plates in axial alignment with a respective spacing means.

2. A clutch member comprising a hub having a radial flange; a pair of ring-like plates having their inner marginal edge portions abutting respective opposite sides of said flange and secured thereto; a plurality of circumferentially spaced, rigid spacing means interposed between and rigidly interconnecting said plates, said spacing means extending inwardly from substantially the outer peripheral edges of said plates and the inner edges of said spacing means being radially spaced from the rotational axis of said clutch member and being adapted to maintain one of said plates in a fixed axially spaced relationship with respect to the other of said plates, at least a portion of each circumferential edge of each spacing means being circumferentially spaced from at least a portion of the adjacent circumferential edge of an adjacent spacing means, each of said spacing means being disposed along a portion of a respective chord of a circle defined by said peripheral edges of said plates, each of said spacing means having a plurality of parallel passages extending therethrough for the circulation of air, the longitudinal axis of each passage lying along a respective chord of a circle defining the peripheral edges of said plates; and a plurality of pairs of friction segments, one segment of each pair being secured to the outer face of one of said plates in axial alignment with a respective spacing means, the other segment of each pair being secured to the outer face of the other plate in axial alignment with the same spacing means.

3. A clutch member comprising a pair of axially spaced plates; a plurality of circumferentially spaced rigid spacing means interposed between and rigidly interconnecting said plates, said spacing means extending inwardly from substantially the peripheral edges of said plates and the inner edges of said spacing means being radially spaced from the rotational axis of said clutch member and being adapted to maintain one of said plates in a fixed axially spaced relationship with respect to the other of said plates, at least a portion of each circumferential edge of each spacing means being circumferentially spaced from at least a portion of the adjacent circumferential edge of an adjacent spacing means, each of said spacing means being disposed along a portion of a respective chord of a circle defined by said peripheral edges of said plates and having a plurality of parallel passages extending therethrough for the circulation of air, the longitudinal axis of each passage lying along a chord of a circle defined by the peripheral edges of said plates; and friction facing material secured to the outer face portion of each of said plates.

4. A clutch member comprising a pair of axially spaced plates; a plurality of circumferentially spaced rigid spacing means interposed between and rigidly interconnecting said plates, said spacing means extending inwardly from substantially the peripheral edges of said plates and the inner edges of said spacing means being radially spaced from the rotational axis of said clutch member and being adapted to maintain one of said plates in a fixed axially spaced relationship with respect to the other of said plates, at least a portion of each circumferential edge of each spacing means being circumferentially spaced from at least a portion of the adjacent circumferential edge of an adjacent spacing means, said spacing means being disposed along portions of chords of a circle defined by said peripheral edges of said plates and having a plurality of parallel passages extending therethrough for the circulation of air, the longitudinal axis of each passage lying along a chord a circle defined by the peripheral edges of said plates, the end of each passage opening into a respective space between the circumferential edges of adjacent spacing means; and friction facing material secured to the outer face portion of each of said plates.

5. A clutch member comprising a pair of axially spaced plates; a plurality of circumferentially spaced rigid spacing means interposed between and rigidly interconnecting said plates, said spacing means extending inwardly from substantially the peripheral edges of said plates and the inner edges of said spacing means being radially spaced from the rotational axis of said clutch member and being adapted to maintain one of said plates in a fixed axially spaced relationship with respect to the other of said plates, at least a portion of each circumferential edges of each spacing means being circumferentially spaced from at least a portion of the adjacent circumferential edge of an adjacent spacing means, said spacing means being disposed along portions of chords of a circle defined by said peripheral edges of said plates and having a plurality of parallel passages extending therethrough for the circulation of air, the longitudinal axis of each passage lying along a chord of a circle defined by the peripheral edges of said plates, the inner edges of said spacing means and portions of said plates defining the outer and side limits of a compartment, one end of each passage opening into said compartment; and friction facing material secured to the outer face portion of each of said plates.

6. A clutch member comprising a hub having a radial flange; a pair of ring-like plates having their inner marginal edge portions abutting respective opposite sides of said flange and secured thereto; a plurality of circumferentially spaced, rigid spacing means interposed between and rigidly interconnecting said plates, said spacing means extending inwardly from substantially the outer peripheral edges of said plates and the inner edges of said spacing means being radially spaced from the rotational axis of said clutch member and being adapted to maintain one of said plates in a fixed axially spaced relationship with respect to the other of said plates, at least a portion of each circumferential edge of each spacing means being circumferentially spaced from at least a portion of the adjacent circumferential edge of an adjacent spacing means, the inner edges of said spacing means and portions of said plates defining the outer and side limits of a compartment, said spacing means being disposed along portions of chords of a circle defined by said peripheral edges of said plates, each of said spacing means having a plurality of parallel passages extending therethrough for the circulation of air, the longitudinal axis of each passage lying along a respective chord of a circle defining the peripheral edges of said plates, one end of each of said passages opening into said compartment; and a plurality of pairs of friction segments, one segment of each pair being secured to the outer face of one of said plates in axial alignment with a respective spacing means, the other segment of each pair being secured to the outer face of the other plate in axial alignment with the same spacing means.

7. A clutch member comprising a hub having a radial flange; a pair of ring-like plates having their inner marginal edge portions abutting respective opposite sides of said flange and secured thereto; a plurality of circumferentially spaced, rigid spacing means interposed between and rigidly interconnecting said plates, said spacing means extending inwardly from substantially the outer peripheral edges of said plates and the inner edges of said spacing means being radially spaced from the rotational axis of said clutch member and being adapted to maintain one of said plates in a fixed axially spaced relationship with respect to the other of said plates, at least a portion of each circumferential edge of each spacing means being circumferentially spaced from at least a portion of the adjacent circumferential edge of an adjacent spacing means, said spacing means being disposed along portions of chords of a circle defined by said peripheral edges of said plates, each of said spacing means having a plurality of parallel passages extending therethrough for the circulation of air, the longitudinal axis of each passage lying along a respective chord of a circle defining the peripheral edges of said plates, one end of each of said passages opening into a respective space between the circumferential edges of an adjacent spacing means; and a plurality of pairs of friction segments, one segment of each pair being secured to the outer face of one of said plates in axial alignment with a respective spacing means, the other segment of each pair being secured to the outer face of the other plate in axial alignment with the same spacing means.

References Cited in the file of this patent

UNITED STATES PATENTS

| | | |
|---|---|---|
| 2,184,506 | Eason | Dec. 26, 1939 |
| 2,197,232 | Wood | Apr. 16, 1940 |
| 2,262,709 | Lambert | Nov. 11, 1941 |
| 2,380,900 | Wellman | July 31, 1945 |
| 2,767,817 | Davis | Oct. 23, 1956 |

FOREIGN PATENTS

| | | |
|---|---|---|
| 703,083 | Germany | Feb. 28, 1941 |